United States Patent

Kuskye et al.

Patent Number: 5,388,670
Date of Patent: Feb. 14, 1995

[54] WEAR-LIMIT WARNING ANTI-RATTLE SPRING

[75] Inventors: Ralph G. Kuskye, Plymouth; Neil J. Clark, Granger; Steven B. Conger, Plymouth, all of Ind.

[73] Assignee: AlliedSignal Inc., Morristown, N.J.

[21] Appl. No.: 97,352

[22] Filed: Jul. 26, 1993

[51] Int. Cl.⁶ ............................................. F16D 65/02
[52] U.S. Cl. .................... 188/73.38; 188/1.11
[58] Field of Search ....... 188/1.11, 73.31, 73.35–73.38

[56] References Cited

U.S. PATENT DOCUMENTS

| | | | |
|---|---|---|---|
| 3,977,499 | 8/1976 | Johannesen | 188/73.36 |
| 4,067,418 | 1/1978 | Rath et al. | 188/73.36 |
| 4,124,105 | 11/1978 | Maehara | 188/1.11 |
| 4,371,060 | 2/1983 | Iwata | 188/73.38 |
| 4,460,067 | 7/1984 | Katagiri et al. | 188/1.11 |
| 4,498,559 | 2/1985 | Katagiri et al. | 188/1.11 |
| 4,609,077 | 9/1986 | Nakatsuhara | 188/73.38 |
| 4,624,344 | 11/1986 | Gerard et al. | 188/73.36 |
| 4,745,992 | 5/1988 | Lusa | 188/1.11 |
| 4,940,119 | 7/1990 | Kondo et al. | 188/73.38 |
| 4,940,120 | 7/1990 | Schmidt et al. | 188/73.38 |
| 4,969,540 | 11/1990 | Cartwright et al. | 188/73.36 |
| 5,033,590 | 7/1991 | Kobayashi et al. | 188/1.11 |
| 5,069,314 | 12/1991 | Madzgalla et al. | 188/73.38 |
| 5,117,947 | 6/1992 | Kobayashi et al. | 188/1.11 |

*Primary Examiner*—Matthew C. Graham
*Attorney, Agent, or Firm*—Leo H. McCormick, Jr.; Larry J. Palguta

[57] ABSTRACT

An anti-rattle spring (11) is mounted in a backing plate (31) of one a pair of opposed backing plate and friction pad assemblies 15 in a generally planar parallel relationship with a rotor (17) engaging friction surfaces and stationary torque support members (19,38). The spring (11) comprises a base portion (21) disposed in a plane which is generally parallel to the planes of the friction surfaces. The base portion (21) is fastened to one of the pads (15) through an elongated boss (39) in backing plate 31 and a corresponding hole (45) in the backing plate (31). The relationship between the elongated hole (45) and boss (39) prevents the anti-rattle spring (11) from rotating on the backing plate 31. The spring (11) also includes a web portion (23) which extends generally perpendicularly from the base portion (21) and a U-shaped resilient cantilevered blade (25) which extends from the web portion (23). The curved blade (25) has a free end (27) which engages the torque support member (19) to provide a resilient biasing between the torque support member (19) and the pad (15). The curved resilient cantilevered blade (25) extends initially from the web portion (23) in a direction away from the torque support member (19) and is subsequently curved back toward and into engagement with the torque support member (19). There is also a relatively flat resilient cantilevered blade (29) extending generally orthogonally from the base portion (21) in a direction opposite the web portion (23). This blade (29) will engage the brake rotor (17) during brake operation only if the thickness of the friction material of the outer brake assembly (15) is less than a predetermined thickness, thus providing an audible wear-limit warning.

2 Claims, 1 Drawing Sheet

U.S. Patent  Feb. 14, 1995  5,388,670
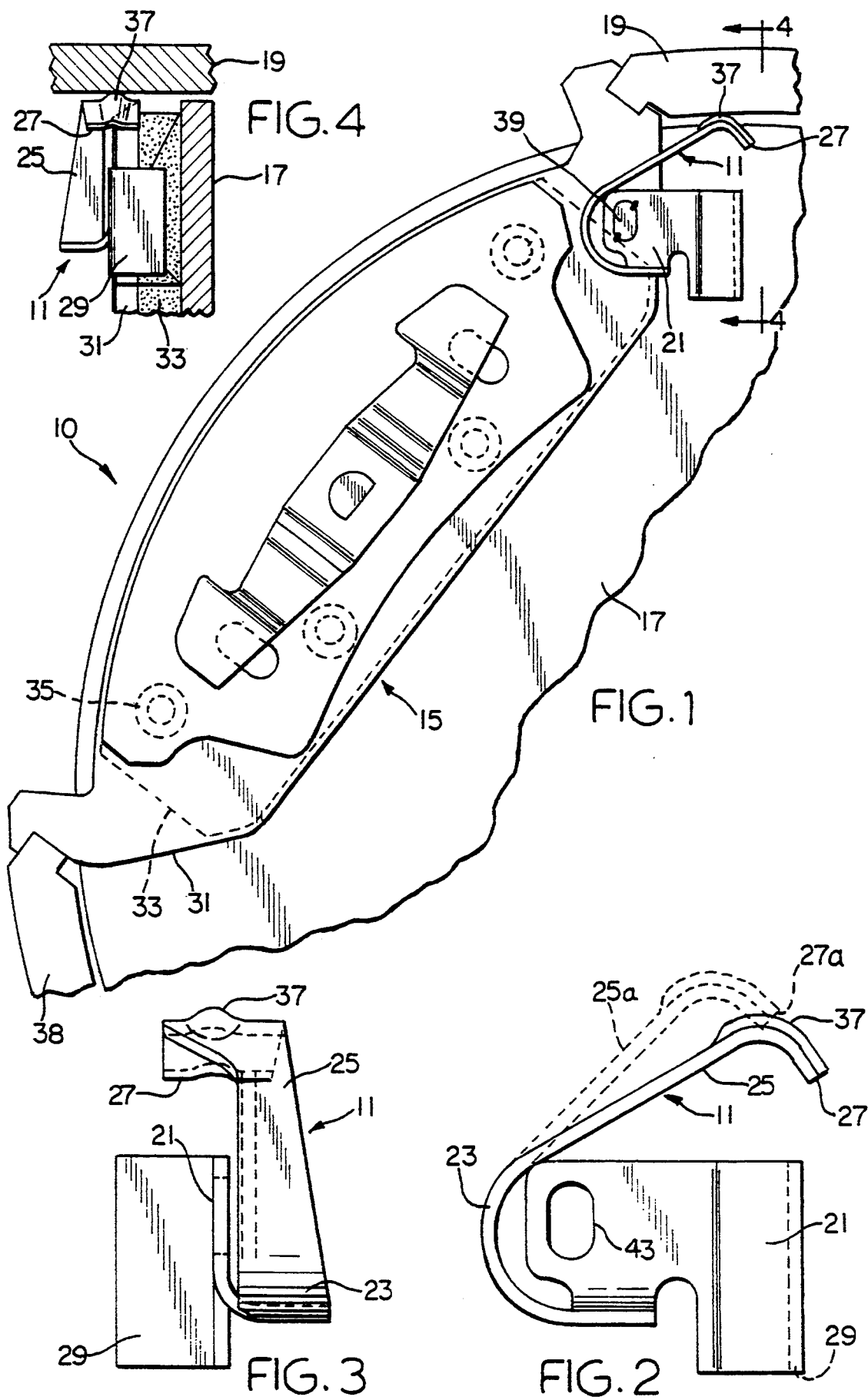

WEAR-LIMIT WARNING ANTI-RATTLE SPRING

The present invention relates generally to an anti-spring for a disc brake, and more particularly to such an anti-rattle spring mounted on a brake pad for biasing the brake pad radially inwardly to prevent rattling thereof and which provides an audible indication when pad wear becomes excessive.

BACKGROUND OF THE INVENTION

Many anti-rattle springs have been proposed to prevent rattling in disk brakes. These springs may be disposed between the caliper and the brake pad, between the caliper and the torque support member, or between the brake pad and the torque support member. Many of these springs have been wire springs, but some have been leaf-type formed of sheet steel. It is desirable to provide a one-piece durable, compact anti-rattle spring which can be economically fabricated and easily installed.

Friction pad wear-limit warning devices for disc brakes are also well known. Typical of such devices are cantilevered springs which mount to a disk pad and have an arm extending from the pad toward the brake rotor. The arm engages the rotor upon brake actuation causing an audible alarm indicating a need for brake pad replacement. It has been suggested in U.S. Pat. No. 4,745,992 to combine this alarm feature with a spring retainer which holds an inner brake shoe assembly to the brake piston. It would be desirable to eliminate such cantilevered springs by incorporating the wear-limit warning feature with an anti-rattle spring.

SUMMARY OF THE INVENTION

The present invention provides a solution to the above problems by providing a combined anti-rattle spring and brake pad wear-limit warning device comprising: a generally planar base portion adapted to be fastened to a first brake component; a web portion extending generally orthogonally from the base portion; and a U-shaped resilient cantilevered blade extending from the web portion, the U-shaped blade having a free end adapted to engage a second brake component for providing a resilient biasing between the first and second brake components.

BRIEF DESCRIPTION OF THE DRAWINGS

One way of carrying out the present invention is described in detail below with reference to the drawings which illustrate a specific embodiment in which:

FIG. 1 is a side elevation view of a portion of a disc brake mechanism including the anti-rattle spring of the present invention;

FIG. 2 is a side elevation view of the anti-rattle spring of FIG. 1;

FIG. 3 is a front elevation view of the spring as seen from the left of FIG. 2; and FIG. 4 is a sectional view taken along line 4—4 of FIG. 1.

Corresponding reference characters indicate corresponding parts throughout the several views of the drawing.

DETAILED DESCRIPTION OF THE INVENTION

FIG. 1 illustrates a portion of a disc brake assembly 10 which includes an inner and outer backing plate and friction pad assemblies. The outer backing plate and friction pad assembly 15, sometimes simply called the shoe or pad, as illustrated in FIG. 1 has a conventional pad or backing plate 31 and friction pad or lining material 33 joined by rivets such as 35. The outer pad 15 overlies a rotor 17 and is aligned with an inner pad (now shown) on the opposite side of rotor 17. The inner and outer pair of opposed disc brake pads have generally planar parallel rotor engaging friction surfaces. The pair of pads are spanned by a caliper (also not shown) which has one or more hydraulic cylinders for brake actuation. The inner backing plate and friction pad is substantially identical with the outer backing plate and friction pad and as a result only the outer assembly 15 will be described in detail. Outer assembly 15 is supported by a pair of stationary torque support members 19 and 38 and slides there on in a direction perpendicular to rotor 17 when the brakes are actuated. The torque support members 19 and 38 are sometimes referred to as a knuckle, anchor plate or adapter plate brackets. The rotor, pads, torque support members, caliper and hydraulic cylinders are conventional.

An anti-rattle spring 11 is mounted on backing plate 31 to provide a generally radially inward biasing force to the outer assembly 15 and therefore also to the caliper. The spring 11 includes a generally planar base portion 21 which is disposed in a plane lying generally parallel to the planes of the friction surfaces and rotor 17 as shown in FIG. 1. Base portion 21 is fastened to backing plate 31 by an elongated boss 39 which passes through elongated hole 43 as best seen in FIG. 2. Engagement of that portion of backing plate 21 surrounding the elongated hole 43 with the elongated boss 39 prevents rotation of the base 21 with respect to the backing plate 31. As shown in FIG. 1, the anti-rattle spring 11 is attached to backing plate 31 by peaning or riveting the end of boss 39.

As best shown in FIGS. 2 and 3, the anti-rattle spring 11 also has a web portion 23 which extends generally perpendicularly from the base portion 21 and a curved resilient cantilevered blade 25 which extends from the web portion 23. The curved blade 25 has a free end 27 with a dimple or projection 37 which engages torque support member 19 to provide a resilient biasing between the torque support member 19 and the outer assemble or pad 15. The dimple or projection 37 provides for point contact with the support member 19 in order to provide substantially friction free movement when the inner and outer assemblies are moved toward rotor 17 to effect a brake application.

Blade 25 and its free end 27 are shown in FIGS. 1, 2 and 3 in their stressed (installed) position. Unstressed blade 25a and its free end 27a are additionally shown in dotted lines in FIG. 2.

Anti-rattle spring 11 also has a relatively flat resilient cantilevered blade 29 extending in a direction generally perpendicular to the base portion 21 in a direction opposite the web portion 23. When the other backing plate and friction pad assembly 15 is initially installed on torque support members 19 and 38, blade 29 is a predetermined distance from rotor 17 as shown in FIG. 4. During each brake application, a portion of the friction pad 33 is worn away through engagement with rotor 17. After a period of use, blade 29 will engages the brake rotor 17 during a brake application to provide an audible warning which indicates that the thickness of the friction lining material 33 is less than a desired wear-limit thickness.

In a preferred form, the curved resilient cantilevered blade 25 is generally U-shaped and extends initially from the web portion 23 in a direction away from the torque support member 19 and is subsequently curved back toward and into engagement with the torque support member 19.

The anti-rattle spring 11 may be formed by shearing and bending a relatively thin flat sheet of spring steel. The spring is attached is normally only attached to the outer backing plate and friction pad assembly 15 of the front disc brake caliper assemblies of a vehicle and is located in a manner that biases the caliper against the shoe abutment hardware (knuckle) thereby providing a compact and inexpensive combination anti-rattle spring and brake pad wear-limit warning device. In one preferred embodiment an appropriately tempered SAE 1070 spring steel about 1.35 mm in thickness was used.

What is claimed is:

1. An anti-rattle spring (11) mounted on a backing plate (31) of one a pair of opposed backing plate and friction pad assemblies (15) in a generally planar parallel relationship with a rotor (17) engaging friction surfaces and stationary torque support members (19, 38) of a disc brake assembly (10), said anti-rattle spring (11) comprising: a base portion (21) disposed in a plane generally parallel to the planes of the friction surfaces of said pad assemblies (15), the base portion (21) fastened to one of the pads (15) through an elongated boss (39) in said backing plate (31) and a corresponding elongated hole (43) in the base portion (21) to prevent the anti-rattle spring (11) from rotating on the backing plate (31), said anti-rattle spring (11) having a web portion (23) which extends generally perpendicularly from the base portion (21) and a curved blade (25) which extends from the web portion (23), said curve blade (25) initially extending from the web portion (23) in a direction away from the torque support member (19) and is subsequently curved back toward said torque support member (19) to define a first cantilevered member with a free end (27) that engages said torque support member (19) to provide a resilient biasing between the torque support member (19) and the pad assembly (15), said anti-rattle spring (11) having a relatively flat resilient blade (29) extending generally orthogonally from the base portion (21) in a direction opposite the web portion (23) to define a second cantilevered member which will engage the brake rotor (17) during brake operation only if the thickness of the friction material of the outer brake assembly (15) is less than a predetermined thickness to provide an audible wear-limit warning.

2. The anti-rattle spring in accordance with claim 1 wherein said free end (27) has a low friction dimple (37) for slidingly engaging the torque support member (19).

* * * * *